United States Patent [19]

Sugiyama et al.

[11] 4,428,003
[45] Jan. 24, 1984

[54] PERIODICAL SIGNAL DETECTION CIRCUIT IN A REPRODUCING APPARATUS

[75] Inventors: Hiroyuki Sugiyama, Isehara; Ryozo Abe; Masaki Sakurai, both of Yokohama; Kenji Yoshihara, Chiba, all of Japan

[73] Assignee: Victor Company of Japan, Ltd., Yokohama, Japan

[21] Appl. No.: 300,672

[22] Filed: Sep. 9, 1981

[30] Foreign Application Priority Data

Sep. 9, 1980 [JP] Japan .................. 55-125108

[51] Int. Cl.³ .............................................. H04N 5/76
[52] U.S. Cl. ........................ 358/342; 369/43; 358/336
[58] Field of Search ............... 358/320, 321, 322, 323, 358/126, 336, 337, 338, 342; 369/43, 44, 47, 50, 109; 360/10.2

[56] References Cited

U.S. PATENT DOCUMENTS 4,315,283 2/1982 Kinjo et al. .................. 358/342
4,321,621 3/1982 Kinjo et al. .................. 358/342
4,331,976 5/1982 Kinjo et al. .................. 358/342
4,360,824 11/1982 Takahashi et al. ............ 358/323

*Primary Examiner*—Robert L. Richardson
*Attorney, Agent, or Firm*—Louis Bernat

[57] ABSTRACT

A periodical signal detection circuit is designed for use in an apparatus which reproduces an information signal and a periodical signal from a recording medium. A separation circuit separates the periodical signal from the reproduced signal. A reference pulse is generated at a repetition frequency which is the same as the frequency of the periodical signal. A first gate circuit responds to the periodical signal obtained from the separation circuit and to the reference pulse signal. A first counter produces an output by counting N of the reference pulses (N is an integer greater than or equal to 2). A second gate circuit passes the signal from the separation circuit according to the output of the first counter. An output circuit detects the signals in responsive to the reference pulse, and the output of either the first or the second gate circuit.

6 Claims, 4 Drawing Figures

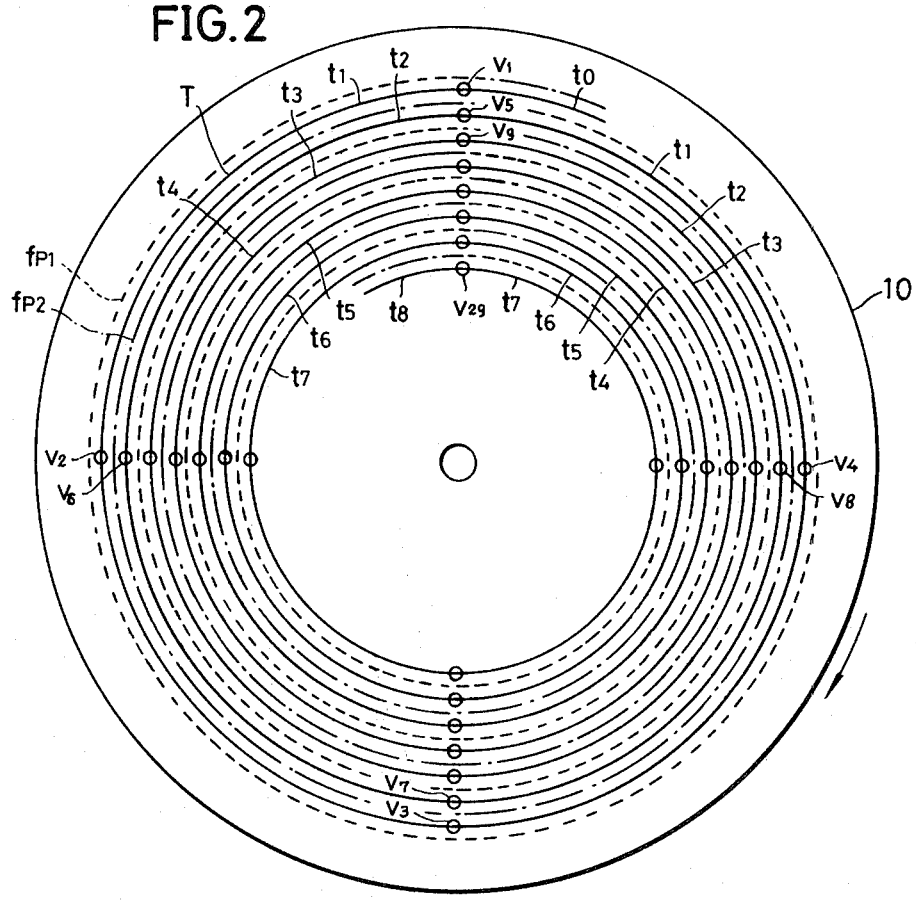

PERIODICAL SIGNAL DETECTION CIRCUIT IN A REPRODUCING APPARATUS

BACKGROUND OF THE INVENTION

The present invention generally relates to periodical signal detection circuits in reproducing apparatuses, and more particularly to a circuit which obtains a periodic predetermined reference signal without being effected by noise, and obtains a periodical reference signal without being effected by dropout of a reproduced reference signal.

Systems have been realized in which a recording system forms pits in accordance with information signal being recorded along a spiral track on a flat rotary recording medium (hereinafter referred to as disc), without forming a groove therein, and a reproducing stylus traces over along this track to reproduce the recorded information signal in response to variations in the electrostatic capacitance in a reproducing system.

In this system, since no groove is provided on the disc for guiding the reproducing stylus, pilot or reference signals are recorded on or in the vicinity of a track of the information signal, such as a video signal, on the disc. Upon reproduction, the reference signals are reproduced together with the video signal. Tracking servo control is carried out so that the reproducing stylus accurately traces along the track in response to the reproduced reference signals.

In the above disc, only one of a first and second reference signals fp1 and fp2 is recorded at an intermediate position between center lines of adjacent track turns. Moreover, the side on which the first and second reference signals are recorded with respect to one track turn changes over every one track turn. That is, when the first and second reference signals are respectively recorded on the right and left sides of one track turn, the relationship between the recorded positions of the reference signals is such that the second and first reference signals are respectively recorded on the right and left sides of adjacent track turns. Furthermore, a third reference signal for obtaining a changeover signal upon reproduction, is recorded for every track turn at recording changeover positions of the above first and second reference signals.

In a reproducing apparatus, a changeover operation is performed by use of the third reference signal reproduced upon obtaining of a tracking control signal from the reproduced first and second reference signals.

However, the above third reference signal is only recorded at one position for every track turn, within a vertical blanking period in a burst manner. Accordingly, it is necessary to accurately obtain the above third reference signal, and obtain a corresponding signal even when a dropout of the signal occurs. Moreover, it is essential that the above signals are obtained without being affected by noise.

SUMMARY OF THE INVENTION

Accordingly, it is a general object of the present invention to provide a novel and useful periodical signal detection circuit in a reproducing apparatus, in which the above described demands have been satisfied.

Another and more specific object of the present invention is to provide a periodical signal detection circuit capable of positively synchronizing a circuit which produces a signal having a frequency equal to that of a reproduced periodical signal with the reproduced periodical signal upon starting of reproduction, without being affected by noise upon operation, and without introducing inconveniences even when dropout of the reproduced periodical signal occurs.

Other objects and further features of the present invention will be apparent from the following detailed description when read in conjunction with the accompanying drawings.

BRIEF DESCRIPTION OF THE DRAWINGS

FIG. 2 is a diagram for explaining the recorded state of reference signals on a track pattern on a rotary recording medium;

DETAILED DESCRIPTION

Figure 1:
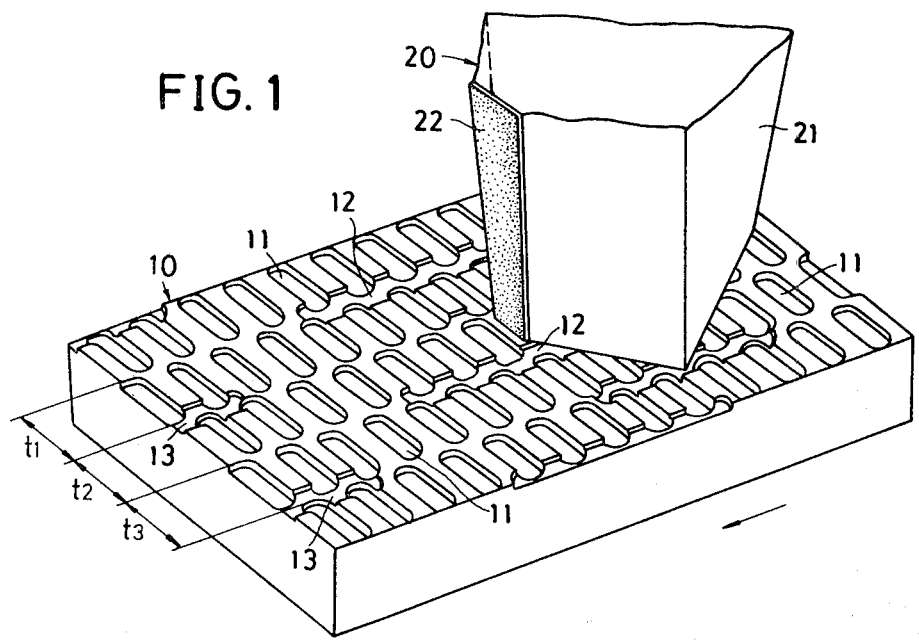
FIG. 1 is a perspective view showing a part of a rotary recording medium in an enlarged state together with a tip end part of a reproducing stylus.

First, description will be given with respect to a rotary recording medium which is reproduced by a rotary recording medium reproducing apparatus to which the periodical signal detection circuit according to the present invention can be applied, by referring to FIGS. 1 and 2.

A video signal is recorded on a spiral track with pits formed on the disc 10 responsive to the information contents of the signal. Track turns of a single continuous spiral track, corresponding to each revolution of the disc 10, are designated by $t_1, t_2, t_3 \ldots$. As shown in FIG. 1, each track turn is constituted by the formation of pits 11 of the main information signal along the plane track path and has no stylus guide groove formed therein. With respect to one track turn $t_1$, in every horizontal scanning period (H) at a position corresponding to the horizontal blanking period, pits 12 of a first reference signal fp1 are formed on one lateral side of the track as viewed in the track path direction. Pits 13 of a second reference signal fp2 are formed on the other side of the track.

At an intermediate position between center lines of adjacent track turns, only pits of either one kind of the pits 12 and 13 of the above reference signals fp1 and fp2 are formed, and with respect to one track, moreover, the sides on which the pits 12 and 13 are formed are changed over for every track turn. That is, if pits 12 and 13 are respectively formed on the right and left sides of one track turn, for example, pits 13 and 12 are respectively formed on the right and left sides of each of the adjacent track turns.

As indicated in FIG. 2, a video signal is recorded along a spiral track T of the disc 10 for two frames, that is, four fields, per one revolution of the disc. In FIG. 2, the tracks of the reference signal fp1 is shown by dotted lines while the tracks of the reference signal fp2 is shown by one-dot chain lines. The positions of the vertical synchronizing signals of respective fields are designated by reference characters V1, V2, V3, . . . , and the successive track parts corresponding to one revolution of the disc of a single spiral track I are respectively designated by track turns $t_1, t_2, t_3, \ldots$. Furthermore, a third reference signal fp3 is recorded at the starting end positions V1, V5, V9, ... of each track turns t₁, t₂, t₃, ..., that is, at positions where the reference signals fp1 and fp2 change over.

The tip end of a reproducing stylus 20 has a shape shown in FIG. 1. The reproducing stylus 20 consists of a stylus structure 21 having a disc tracing surface which has a width greater than a track width, and an electrode 22 fixed to the rear face of the stylus structure 21. As the reproducing stylus 20 traces along a track on the disc 10 which is rotating in a direction indicated by an arrow, the video signal recorded thereon by the formation of pits is reproduced as variations in the electrostatic capacitance between the surface of the disc 10 and the electrode 22 of the reproducing stylus 20.

Figure 3:
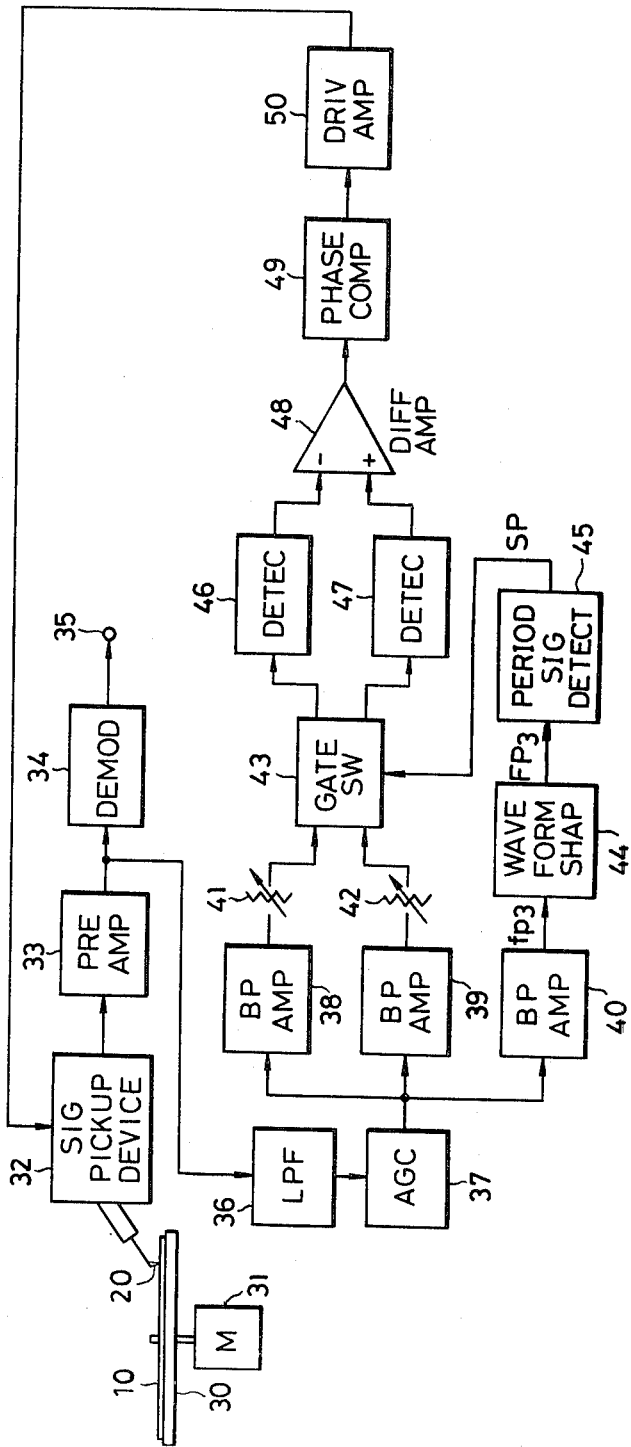
FIG. 3 is a systematic block diagram showing an example of a rotary recording medium reproducing apparatus applied with a periodical signal detection circuit according to the present invention.

In FIG. 3, the disc 10 is placed onto a turntable 30, and rotated at a rotational speed of fifteen revolutions per second, that is, 900 revolutions per minute, by a motor 31. A reproduced signal picked up from the disc 10 as minute variations in the electrostatic capacitance by the reproducing stylus 20 of a signal pickup device 32, is supplied to a preamplifier 33 having a resonant circuit. The resonance frequency of the resonant circuit varies in response to this variation in the electrostatic capacitance, and is formed into a signal of a desired level. The resulting output of the preamplifier 33, is demodulated into the original video signal by a demodulator 34 and is obtained as an output through an output terminal 35.

The output signal of the preamplifier 33 is supplied to a lowpass filter 36 wherein the reference signals fp1, fp2, and fp3 are separated. The output reference signals pass through an automatic gain control circuit 37 and are respectively supplied to amplifiers 38, 39, and 40. Here, each of the amplifiers 38, 39, and 40 is a kind of a band-pass amplifier respectively designed to have steep passing frequency characteristics at only the respective frequency fp1, fp2 and fp3. As a result, the signals having frequencies fp1 and fp2 are respectively separated and obtained from the amplifiers 38 and 39. These signals respectively pass through level adjustors 41 and 42, wherein the levels of the signals are adjusted. The resulting signals are then supplied to a gate switching circuit 43.

The reference signal fp3 separated and amplified at the above band-pass amplifier 40, is supplied to a waveform shaping circuit 44 comprising a Schmitt circuit. The signal thus supplied to the waveform shaping circuit 44 undergoes waveform-shaping so that the signal is not affected by noise and other influences. The reference signal fp3 thus subjected to the waveform-shaping, is supplied to a periodical signal detection circuit 45 of the present invention. An output signal of the above detection circuit 45 is supplied to the gate switching circuit 43 as a switching pulse SP.

The gate switching circuit 43 performs switching of the reference signals fp1 and fp2 every one revolution period of the disc 10 upon normal reproduction, in response to the above switching pulse SP applied thereto. Hence, due to the switching pulse SP which reverses polarity every two frames (1/15 seconds), the reference signals fp1 and fp2 are always respectively supplied to wave detecting circuits 46 and 47 with predetermined polarities, from the gate switching circuit 43.

The detecting circuits 46 and 47 detect the envelopes of their respective input reference signals, and convert the input reference signals into DC voltages. These DC voltages are then supplied to a differential amplifier 48. The differential amplifier 48 compares the output signals of the two detecting circuits 46 and 47 which vary in response to the reproduced levels of the reference signals fp1 and fp2, and generates an output tracking error signal which indicates the tracking error direction and the error quantity. This error signal passes through a phase compensation circuit 49 and is further amplified to a specific level by a driving amplifier 50.

The output signal of the driving amplifier 50 is applied to a coil of the signal pickup device 32 as a control signal, to control the signal pickup device 32. Accordingly, a cantilever mounted with the reproducing stylus 20 undergoes displacement whereby the reproducing stylus 20 is tracking controlled so that the above tracking error signal becomes zero, that is, so that the reproducing stylus 20 correctly traces over the track T of the disc 10.

The disc 10 shown in FIG. 1 is not formed with grooves for guiding the reproducing stylus 20. Hence, tracking must be performed so that the reproducing stylus 20 accurately traces over each track, and it becomes necessary to accurately obtain the tracking error signal. Accordingly, the above switching signal must be accurately obtained.

Next, description will be given with respect to an embodiment of the periodical signal detection circuit 45 according to the present invention, which is capable of accurately obtaining the switching signal, by referring to FIG. 4.

A reference clock generator 60 generates a clock signal having a predetermined frequency of approximately 115 kHz, for example. The clock pulse thus generated, is supplied to a counter 61. Every time the counter 61 counts a predetermined number k of clock signals and returns to zero, the outputs of the counter 61 all become of high level. Hence, a pulse is produced from an AND-gate 62.

The generating clock frequency of the reference clock generator 60 and the count number of the counter 61 are respectively set so that the output pulse frequency of the AND-gate 62 becomes equal to the repetition frequency of the third reference signal fp3 which is reproduced and subjected to the waveform-shaping. In the present embodiment of the invention, the third reference signal fp3 is recorded at one position for one track turn. Therefore, the repetitive frequency of the third reference signal fp3 which is reproduced and subjected to the waveform-shaping is 15 Hz, and the output pulse frequency of the AND-gate 62 accordingly becomes 15 Hz. The above output pulse of the AND-gate 63 is supplied to an AND-gate 63, an OR-gate 64, and a counter 65.

On the other hand, the third reference signal fp3 obtained from the waveform shaping circuit 44 is supplied to the AND-gate 63 and an AND-gate 69, through a terminal 67.

At the instant when the reproducing stylus 20 is lowered onto the disc 10 to start a reproducing operation, the output pulse of the AND-gate 62 and the reference signal fp3 obtained from the terminal 67 are not in synchronism with each other. Moreover, no output is obtained from the AND-gate 63. The output pulse of the AND-gate 62 which has passed through the OR-gate 64 is applied to a reset terminal 61a of the counter 61. Thus, the counter 61 is reset by the output pulse of the AND-gate 62, and starts a new counting operation. Since no output is obtained from the AND-gate 63, the counter 65 is not reset. Accordingly, the counter 65 continues to count the output pulse of the AND-gate 62. During the period in which the counter 65 is performing a counting operation, even when the reference signal fp3 is supplied from the terminal 67, the reference signal fp3 does not pass through the AND-gate 63 since the output of the AND-gate 62 and the reference signal fp3 are not in synchronism with each other. Furthermore, even when a noise component is supplied from the terminal 67, no output is obtained from the AND-gate 63 since the probability is such that it is unlikely for the noise component and the output of the AND-gate 62 to coincide.

The outputs of the counter 65 all become of high level every time the counter 65 counts N (N is an integer greater than or equal to 2, and is 3 in the present embodiment of the invention) pulses. Hence, the output of an AND-gate 68 is supplied to the AND-gate 69, to open the AND-gate 69.

The output signal of the waveform shaping circuit 44 applied to the terminal 67, includes a noise component besides the original reference signal fp3. Thus, in a case where the noise component is first obtained from the terminal 67 after the AND-gate 69 opens, the noise component passes through the AND-gate 69, and is applied to the reset terminal 61a of the counter 61 after further passing though the OR-gate 64. Therefore, the counter 61 is reset by the noise component, and simultaneously, a pulse is obtained from the AND-gate 62. An output is thus obtained from the AND-gate 63, since the noise component from the terminal 67 which has reset the counter 61 and the output pulse of the AND-gate 62 are supplied to the AND-gate 63. Hence, the output of the AND-gate 63 is supplied to a reset terminal 65a of the counter 65, to reset the counter 65. When the counter 65 is reset, the AND-gate 69 becomes closed.

The counter 65 which has been reset, again counts the output pulse of the AND-gate 62. Generally, the noise components are at random and are not periodical. Thus, when the output pulse of the AND-gate 62 is supplied to the AND-gate 63, no signal is obtained from the terminal 67. Accordingly, during the period in which the counter 65 counts the pulses from the AND-gate 62 three times, no AND-operation is performed at the AND-gate 63.

When the counter 65 counts the pulses three times, the AND-gate 69 again opens in a manner similar to that described above. If the noise component is also obtained from the terminal 67, an operation similar to that described above is performed.

During the above described operation, the output pulses of the AND-gates 62 and 63 which have passed through the OR-gate 64 reset the counter 61. Moreover, these output pulses are obtained as an output pulse through an output terminal 66. However, since the above pulses are not in synchronism with the reference signal fp3, a normal tracking operation cannot be performed.

Accordingly, after the counter 61 is synchronized to one signal (the noise component in the above described case), the AND-gate 63 detects whether a signal which is in synchronism with the above one signal and the frequency of 15 Hz during the period in which the counter 65 counts the pulses three times, that is, during the period in which the disc 10 undergoes three revolutions.

Next, it is assumed that after the counter 65 again counts the pulses three times and the AND-gate 69 opens, the reference signal fp3 is obtained. In this case, the reference signal fp3 passes through the AND-gate 69 and the OR-gate 64, and obtained as the switching pulse SP through the output terminal 66. Moreover, the reference signal fp3 which has passed through the AND-gate 69 and the OR-gate 64 is applied to the reset terminal 61a of the counter 61 to reset the counter 61.

In addition, the output pulse of the AND-gate 62 and the reference signal fp3 obtained when the counter 61 is reset, are respectively applied to the AND-gate 63. Further, the output of the AND-gate 63 is supplied to the reset terminal 65a of the counter 65 to reset the counter 65.

After the counter 61 is reset by the reference signal fp3, the counter 61 produces a pulse which is in synchronism with the reference signal fp3. Therefore, when the reference signal fp3 is supplied to the terminal 67 for the second time, the AND-gate 62 also produces an output pulse. The reference signal fp3 and the output pulse of the AND-gate 62 are thus supplied to the AND-gate 63. Accordingly, the counters 61 and 65 are respectively reset, and the switching pulse SP is obtained through the output terminal 66. The switching pulse 66 thus obtained, is applied to the gate switching circuit 43, to perform the above described switching operation.

Even when a noise component is introduced from the terminal 67 between one reference signal fp3 and a following reference signal fp3, this noise component does not coincide with the output pulse of the AND-gate 62. Thus, the noise component does not pass through the AND-gate 63. In addition, the counter 65 is reset before the counter 65 counts the output pulses of the AND-gate 62 three times (in a normal state, when the pulse is counted once). Hence, the AND-gate 69 is not open, and the noise component from the terminal 67 does not pass through the AND-gate 69. Accordingly, once synchronism is obtained with the reference signal fp3, the noise component does not introduce any affection.

In a case where the reference signal fp3 is dropped out due to some causes and not reproduced during reproduction, no output is obtained from the AND-gate 63. However, the output pulse of the AND-gate 62 which is already in synchronism with the previous reference signal fp3 is directly obtained through the output terminal 66 as the switching pulse SP, through the OR-gate 64. Moreover, the output pulse of the OR-gate 64 is also supplied to the reset terminal 61a of the counter 61 to reset the counter 61. Therefore, even when drop-out of the reference signal occurs, the switching pulse SP can always be obtained in a normal manner.

When the reference signal fp3 is dropped out more than three times, the AND-gate 69 opens according to the output of the counter 65, and an operation similar to that performed upon starting of the reproduction is thereafter performed. However, it is very unlikely that the reference signal is actually dropped out a plurality of times, and the probability for this to occur is exceedingly small.

In the above described embodiment of the invention, the counter 65 is constructed to count the output pulse of the AND-gate 62 three times. However, the counter 65 can be constructed to count two times or more than or equal to four times. From a practical point of view, it is desirable for the counter 65 to count two or three times.

Figure 4:
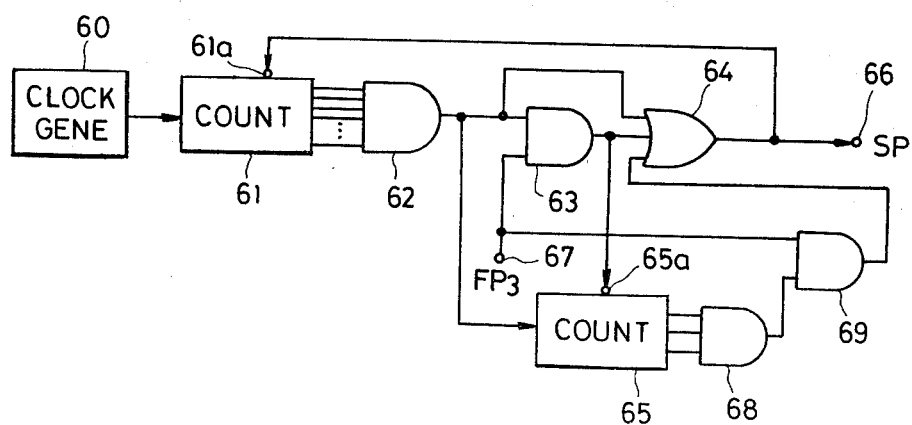
FIG. 4 is a systematic circuit diagram showing an embodiment of a periodical signal detection circuit according to the present invention.

The above described operation performed by the circuit system shown in FIG. 4, can be performed by use of a micro-computer. Moreover, in the above embodiment of the invention, the counter 61 is constructed to be reset by the output of the OR-gate 64, however, the counter 61 can be constructed to be set by the output of the OR-gate 64.

Further, the present invention is not limited to these embodiments, but various variations and modifications may be made without departing from the scope of the present invention.

What is claimed is:

1. A periodic signal detection circuit in an apparatus which reproduces an information signal and a periodic signal from a recording medium recorded with the information and periodic signals, said periodic signal detection circuit comprising:
    separation circuit means for separating said periodic signal from the reproduction signal;
    reference pulse signal generating circuit means for generating a reference pulse signal having a repetition frequency which is the same as said periodic signal;
    first gate circuit means for producing an output signal responsive to a coincidence of the periodic signal obtained from said separation circuit means and the reference pulse signal obtained from said reference pulse signal generating circuit means;
    first counter means for producing an output responsive to counting N reference pulses of said reference pulse signals (N is an integer greater than or equal to 2);
    second gate circuit means for passing the signal from said separation circuit means responsive to the output of said first counter means; and
    output circuit means for passing said reference pulse signal, the output of said first gate circuit, and the output of said second gate circuit to constitute a detected periodic signal.

2. A periodic signal detection circuit as claimed in claim 1 in which said reference pulse signal generating circuit means is driven responsive to said detected periodic signal in order to generate the reference pulse signal which is synchronized with said detected periodic signal.

3. A periodic signal detection circuit as claimed in claim 1 in which said reference pulse signal generating circuit means has a generator for generating a reference clock signal, and second counter means for cyclically producing said reference pulse signals every time the counted value of the clock pulse obtained from said generator reaches a predetermined count value, said second counter means being reset or set by the signal from said output circuit means.

4. A periodic signal detection circuit as claimed in claim 1 in which said output circuit means is an OR-gate supplied with the output of said reference pulse signal generating circuit means, said first gate circuit means, and said second gate circuit means.

5. A periodic signal detection circuit as claimed in claim 1 in which said first counter means is reset by the output of said first gate circuit means.

6. A periodic signal detection circuit as claimed in claim 3 in which said recording medium is a rotary recording medium recorded with said information signal and periodic signal along spiral or concentric track turns, said periodic signal is recorded at one position in each track turn, and said second counter means counts down said reference clock signal frequency to produce a frequency equal to the repetition frequency of said reproduced periodic signal.

* * * * *

UNITED STATES PATENT AND TRADEMARK OFFICE
CERTIFICATE OF CORRECTION

PATENT NO. : 4,428,003

DATED : January 24, 1984

INVENTOR(S) : Hiroyuki Sugiyama, et al.

It is certified that error appears in the above-identified patent and that said Letters Patent is hereby corrected as shown below:

Column 7, Claim 1, line 20, change "reproduction" to --reproduced--.

Signed and Sealed this

Second Day of October 1984

[SEAL]

Attest:

GERALD J. MOSSINGHOFF

*Attesting Officer*   *Commissioner of Patents and Trademarks*